H. STRYCKER.
Apparatus for Scalding Hogs.
No. 151,322. Patented May 26, 1874.
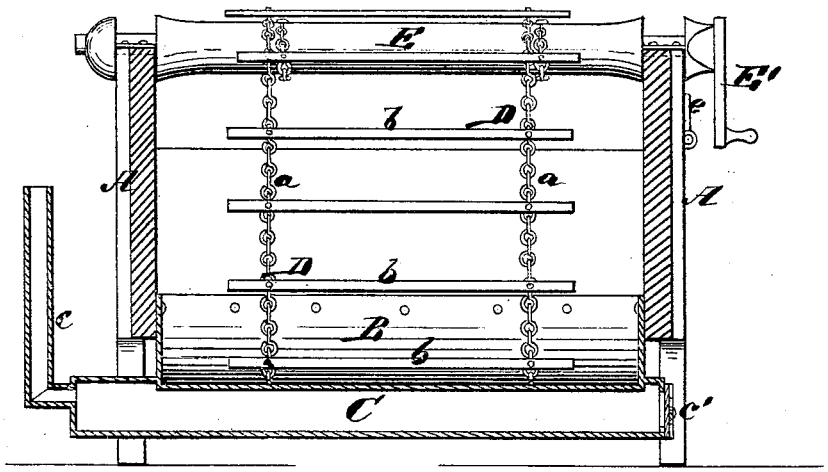
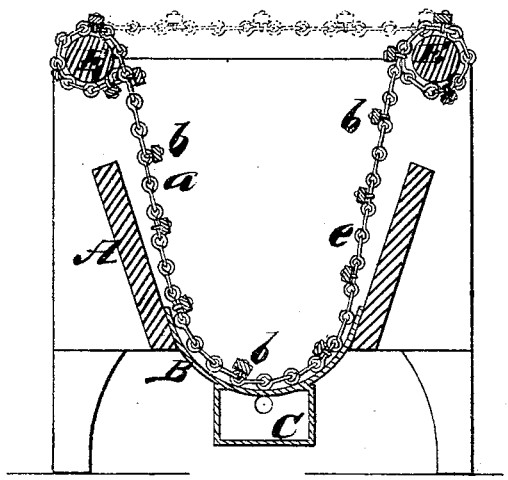 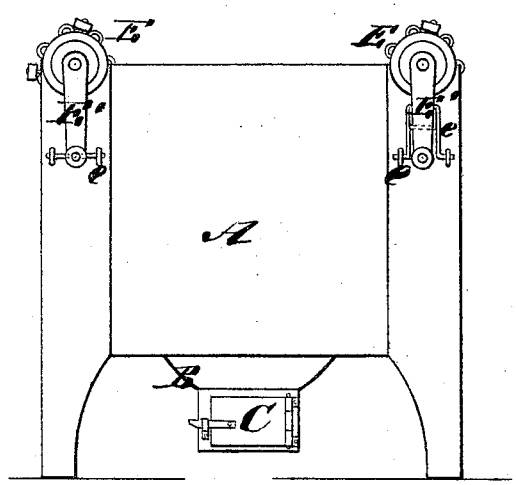

UNITED STATES PATENT OFFICE.

HENRY STRYCKER, OF CONCORD TOWNSHIP, ELKHART COUNTY, INDIANA.

IMPROVEMENT IN APPARATUS FOR SCALDING HOGS.

Specification forming part of Letters Patent No. 151,322, dated May 26, 1874; application filed August 16, 1873.

*To all whom it may concern:*

Be it known that I, HENRY STRYCKER, of Concord township, in the county of Elkhart and State of Indiana, have invented a new and useful Improvement in Caldrons for Scalding Hogs; and I do hereby declare that the following is a full, clear, and exact description thereof, reference being had to the accompanying drawings making a part of this specification, in which—

Figure 1 is a section taken longitudinally and vertically through the center of the improved caldron. Fig. 2 is a section taken vertically and transversely through the same. Fig. 3 is an end view.

Similar letters of reference indicate corresponding parts in the three figures.

The object of my invention is to combine with a caldron a flexible rack and two rollers, whereby a hog can be conveniently lowered into the caldron, scalded, and then raised up out of the water and discharged upon a suitable receptacle, as will be hereinafter explained.

The following description of my invention will enable others skilled in the art to understand it.

In the accompanying drawings, A represents a caldron of suitable capacity, having a metallic bottom, B, beneath which is a furnace, C. This furnace extends from one end of the caldron to the other, and is provided in front with a door, c', and behind with a smoke-pipe, c. D represents a flexible rack, which is made up of chains a a and cross-pieces b. The ends of this rack are secured to two horizontal rollers, E, which have their bearings on top of the ends of the caldron, on opposite sides of the middle of its width, and which are provided with crank-handles E E'.

By turning the rollers the rack can be wound upon or unwound from them, and by means of forked catches e e (shown in Figs. 1 and 3) the cranks and their rollers are held from turning when the rack is wound up, as indicated in dotted line, Fig. 2.

The operation is simply to wind the rack D upon the rollers E E until it is drawn taut, as indicated in Fig. 2, in dotted lines. The animal is then put upon this rack and lowered into the water. When the animal is properly scalded the rack is again wound up, which raises the animal out of the water, after which, by continuing to wind the rack on one roller and allowing it to unwind from the other roller, the animal will be discharged from one side of the caldron.

It will be seen that the work of scalding hogs by my improvement is rendered very simple, speedy, and convenient.

I do not claim a horse-fastener in which unmanageable live animals are confined while being shod or otherwise treated, as such contrivances are not adapted for scalding hogs after they have been killed, or have been rendered manageable, or are in a condition which renders the use of stocks and other controlling contrivances wholly unnecessary; but What I do claim as my invention, and desire to secure by Letters Patent, is—

The combined animal scalding and delivering apparatus, as herein described, the combination consisting of a caldron, A, flexible rack D, and windlass-rollers E E, as set forth.

HENRY STRYCKER.

Witnesses:
F. A. HASCALL,
MILO S. HASCALL.